US012738693B2

(12) United States Patent
Weiss et al.

(10) Patent No.: US 12,738,693 B2
(45) Date of Patent: Sep. 15, 2026

(54) SAFETY ELEMENT AND PLUG CONNECTOR

(71) Applicant: HIRSCHMANN AUTOMOTIVE GMBH, Rankweil/Brederis (AT)

(72) Inventors: Marco Weiss, Rankweil (AT); Markus Battisti, Hard (AT); Jan-Patrick Schulz, Wasserburg (DE); Raphael Hoor, Feldkrich (AT); Jonas Daenicke, Dornbirn (AT)

(73) Assignee: Hirschmann Automotive GmbH, Rankweil/Brederis (AT)

( * ) Notice: Subject to any disclaimer, the term of this patent is extended or adjusted under 35 U.S.C. 154(b) by 3 days.

(21) Appl. No.: 18/282,517

(22) PCT Filed: Apr. 26, 2022

(86) PCT No.: PCT/EP2022/061105
§ 371 (c)(1),
(2) Date: Sep. 16, 2023

(87) PCT Pub. No.: WO2022/229221
PCT Pub. Date: Nov. 3, 2022

(65) Prior Publication Data

US 2024/0145993 A1 May 2, 2024

(30) Foreign Application Priority Data

Apr. 26, 2022 (DE) ..................... 10 2021 110 613.3

(51) Int. Cl.

*H01R 13/639* (2006.01)
*H01R 4/01* (2006.01)
*H01R 13/631* (2006.01)
*H01R 13/703* (2006.01)
*H01R 13/713* (2006.01)

(52) U.S. Cl.

CPC ............. *H01R 13/639* (2013.01); *H01R 4/01* (2013.01); *H01R 13/7032* (2013.01); *H01R 13/7137* (2013.01); *H01R 13/6315* (2013.01); *H01R 2201/26* (2013.01)

(58) Field of Classification Search

CPC .... H01R 13/639; H01R 4/01; H01R 13/7032; H01R 13/7137; H01R 13/6315; H01R 2201/26; H01H 37/767
See application file for complete search history.

(56) References Cited

U.S. PATENT DOCUMENTS 796,904 A * 8/1905 Fiske .................. H01H 37/767 337/413
4,643,500 A * 2/1987 Krumme ............. H01R 12/856 439/267
4,846,729 A * 7/1989 Hikami ................ H01R 12/856 439/260

(Continued)

*Primary Examiner* — Thienvu V Tran
*Assistant Examiner* — Muaamar Qahtan Al-Taweel
(74) *Attorney, Agent, or Firm* — Harness, Dickey & Pierce, P.L.C.; Anthony G. Fussner

(57) ABSTRACT

A safety element for an electrical connector is designed such that it is electrically insulating below a limit temperature ($T_{Limit}$) and such that it is electrically conductive above the limit temperature ($T_{Limit}$).

17 Claims, 2 Drawing Sheets

(56) References Cited

U.S. PATENT DOCUMENTS

Figure 4:
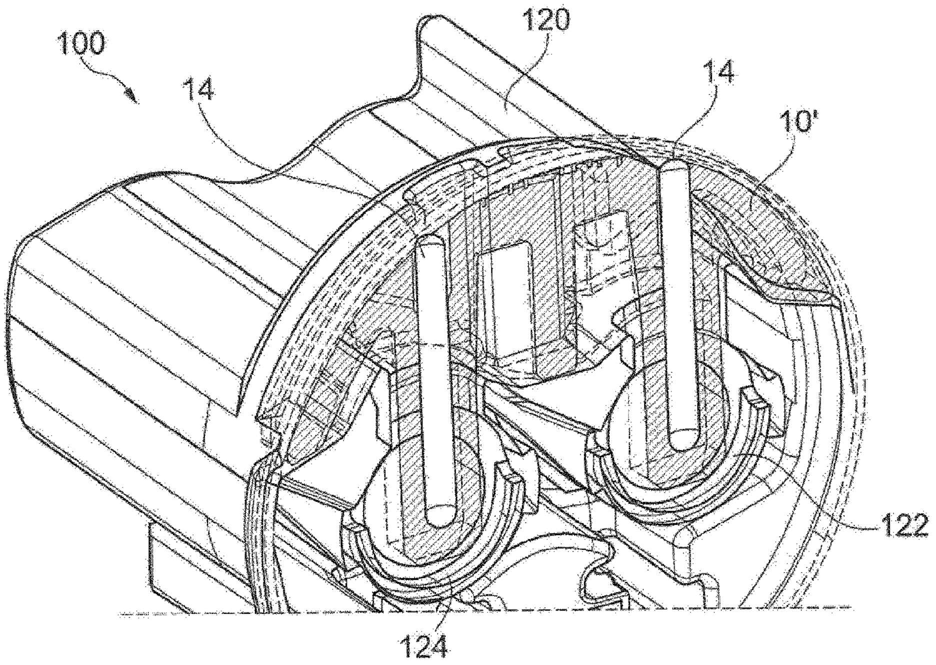

| | | | | | |
|---|---|---|---|---|---|
| 5,275,575 | A * | 1/1994 | Cahaly | H01R 13/7032 439/352 |
| 5,648,634 | A * | 7/1997 | Avory | F42B 3/195 149/19.91 |
| 6,796,245 | B2 * | 9/2004 | Parker | F42B 3/103 102/202.7 |
| 7,005,591 | B1 * | 2/2006 | Fleury | H01R 24/30 200/51 R |
| 10,069,245 | B2 | 9/2018 | Huhmann | |
| 10,148,034 | B2 | 12/2018 | Lyon | |
| 11,398,704 | B2 | 7/2022 | Nalborczyk | |
| 11,450,994 | B2 | 9/2022 | Brasse | |
| 2002/0172259 | A1 * | 11/2002 | Bach | G01K 1/12 374/E1.016 |
| 2006/0068636 | A1 * | 3/2006 | Meleck | H01R 13/6271 439/606 |
| 2017/0077656 | A1 * | 3/2017 | Beideman | H01H 37/74 |
| 2021/0175741 | A1 * | 6/2021 | Blank | B66C 13/22 |
| 2022/0250491 | A1 * | 8/2022 | Fuehrer | H01R 13/5227 |
| 2022/0285891 | A1 * | 9/2022 | Fabre | H01H 37/76 |

* cited by examiner

Fig. 1
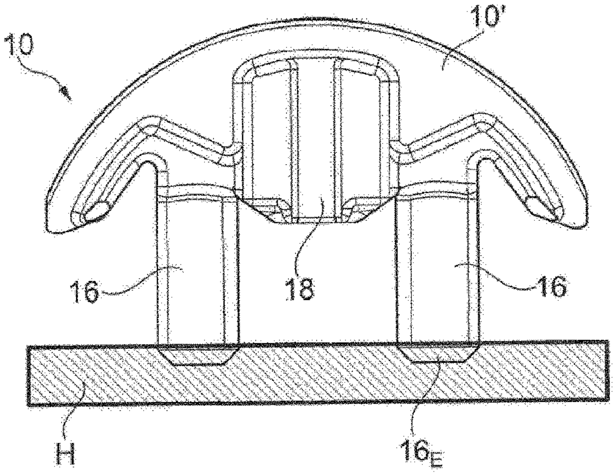
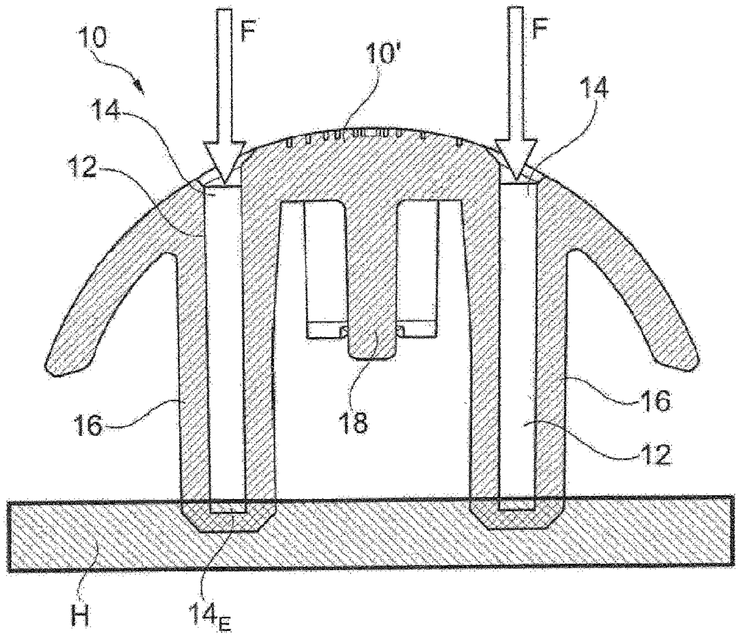
Fig. 2
Fig. 3
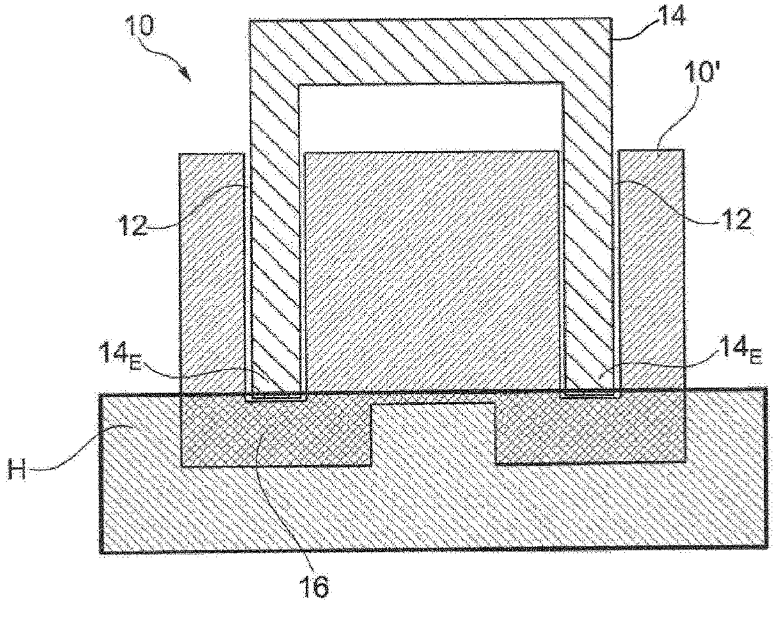

SAFETY ELEMENT AND PLUG CONNECTOR

CROSS REFERENCE TO RELATED APPLICATIONS

This application is the US-national stage of PCT application PCT/EP2022/061105 filed 26 Apr. 2022 and claiming the priority of German patent application 102021110613.3 itself filed 26 Apr. 2021.

The present invention relates to a safety element for an electrical connector and to a connector having such a safety element.

Safety elements for electrical connectors known from the prior art always have the same mode of operation regardless of environmental influences. If a large amount of heat is generated due to a malfunction in the connector, this malfunction cannot be detected and the connector fails.

Based on this, the object of the invention is to create a safety element for a connector that allows dangerous malfunctions to be avoided and the associated damage to be prevented.

This object is attained by the features of claim 1. Furthermore, this object is attained by the features of claim 10. Advantageous embodiments and further developments are the subject of the subclaims.

According to the invention, an electrical connector has a safety element. This safety element is designed in such a way that it is an electrically insulating below a predetermined limit temperature. Furthermore, the safety element is designed in such a way that it is electrically conductive above the limit temperature.

Furthermore, according to the invention, a connector is provided comprising such a safety element or a safety element described further below.

The limit temperature is the temperature at which the electrical resistance or electrical conductivity of the safety element changes in such a way that the safety element becomes electrically conductive above the limit temperature. Below the limit temperature, the safety element is electrically insulating. This ensures that the safety element is designed in such a way that a connector having such a safety element has its intended functionality below the limit temperature in the sense of providing an electrical connection. Above the limit temperature, the safety element becomes electrically conductive and an intentional malfunction occurs in the connector. This malfunction can be, for example, a short circuit or an electrically measurable malfunction of the connector. This can also trigger a safety function.

In particular, the insulation resistance of the safety element is temperature dependent. This means that the insulation resistance changes with the temperature of the safety element. The insulation resistance of the safety element refers to the safety element as a structural unit, regardless of how many components the safety element comprises as a whole. The insulation resistance of the safety element can change, for example, due to melting of a component or part and/or due to temperature-dependent changes in the material properties (such as changes in electrical conductivity or electrical resistance) of individual components of the safety element.

A first threshold value of the insulation resistance ($R_{iso}$) at which the safety element is considered electrically conductive in the sense of the invention may be, for example, 500 KF. Further, a second threshold value may be, for example, 100 KF.

Preferably, the limit temperature is such that even if the limit temperature is reached or exceeded, the connector is not damaged or destroyed but remains intact. This is achieved in particular by the limit temperature only occurring in a hottest zone of the connector holding at least part of the safety element.

In a further development of the invention, it is provided that the safety element is a secondary interlock that is preferably designed to lock together a first plug-in connection element and a second plug-in connection element of a plug-in connector. This defines that the safety element is a secondary interlock that is designed to secondarily interlock a connector, i.e. to provide an additional interlock to a primary interlock of a connector.

The secondary interlock may be a separate component from the first connector element and the second connector element that is formed independently of the first connector element and the second connector element of the connector. This allows the secondary interlock to be easily replaced, which may be necessary, for example, after the limit temperature has been exceeded.

In further development of the invention, it is provided that the limit temperature lies in a range from 200° C. to 250° C., preferably in a range from 210° C. to 240° C., further preferably in a range from 220° C. to 230° C. This ensures that the limit temperature that is preferably present only in the hottest zone of the connector, is in a temperature range in which damage to the connector is prevented.

In a further embodiment of the safety element, it is provided that the safety element is formed from a polymer that is electrically conductive above the limit temperature. This provides a safety element that is electrically conductive above the limit temperature due to its material properties.

In further development of the safety element, it is provided that the safety element comprises a base body made of a polymer that has a melting temperature corresponding to the limit temperature. This ensures that the base body melts when the limit temperature is reached.

In a further embodiment, it is provided that the base body of the safety element is formed from a polymer that is electrically conductive above the limit temperature.

Furthermore, in a further development of the safety element, it is provided that the base body is formed with at least one bore that accommodates at least one electrically conductive element.

In particular, the safety element is designed in such a way that, when the limit temperature is exceeded, the polymer from which the base body is formed melts and the at least one electrically conductive element is exposed, so that the safety element becomes electrically conductive when the limit temperature is exceeded. This ensures that electrical contact can be established through the electrically conductive element of the safety element, so that the safety element is electrically conductive. As a result, after the limit temperature has been exceeded once, the safety element becomes permanently conductive. If such a permanently conductive safety element is installed in a connector, the safety function is triggered until the safety element is replaced.

In an advantageous embodiment, the at least one electrically conductive element may be formed from a conductive polymer or a metal.

In a further advantageous embodiment, two bores are formed in the base body. An electrically conductive element is preferably in each bore.

In further aspects of the invention, the at least one electrically conductive element may be a pin.

In a further embodiment of the safety element, it is provided that the safety element comprises an element made of bimetallic material that is designed to change electrical resistance and/or shape depending on the temperature in such a way that it is electrically insulating below a limit temperature and an electrically conducting effect above the limit temperature.

In a further embodiment, this may be a reversible safety element that is electrically conductive when the limit temperature is exceeded and electrically insulating when the temperature falls below the limit again.

Furthermore, this can be a reusable safety element that allows the limit temperature to be exceeded and/or undershot several times.

It is further provided that the safety element comprises a shape-memory alloy that changes shape above the limit temperature so that the safety element becomes electrically conductive when the limit temperature is exceeded. Herein, another alternative embodiment is disclosed based on a change in shape of the safety element. In this way, an electrically conductive effect can also be reliably produced when used overhead or in other cases in which the function of a safety element could possibly be restricted.

In further development of the safety element, it is provided that the safety element is a shape memory element, preferably a 3D-printed element that is designed in such a way that it changes its shape above the limit temperature so that the safety element becomes electrically conductive when the limit temperature is exceeded. This makes it possible to realize shapes that cannot be realized by other manufacturing processes. Furthermore, as described above, the possibility of changing the shape means that an electrically conductive effect can be reliably produced even in overhead use or in other cases in which the function of a safety element might be restricted.

In a further development of the connector, it is provided that the connector is a HV connector (high-voltage connector). “High voltage” in the sense of the invention, refers here to alternating voltages (AC) of 30 V to 1 kV or to direct voltages (DC) of 60 V to 1.5 kV. This relates to a connector that meets the requirements of modern vehicle systems such as battery electric vehicles (BEV) or plug-in hybrid vehicles (PHEW).

Further, in another embodiment of the connector, it includes a first plug connector and a second plug connector.

Further, the safety element may be configured as a secondary interlock to lock together the first plug connector and the second plug connector.

Preferably, the connector also has a primary interlock in addition to the safety element designed as a secondary interlock.

In a further development of the connector, it is provided that in a secondary locked position of the connector, the safety element is in the hottest zone of the connector and is electrically conductive above the limit temperature, so that a planned malfunction of the connector occurs above the limit temperature.

In addition to the environmental parameters of temperature described above, a second environmental parameter, such as humidity, can also influence the electrical conductivity or electrical resistance of the safety element.

Figure 5:
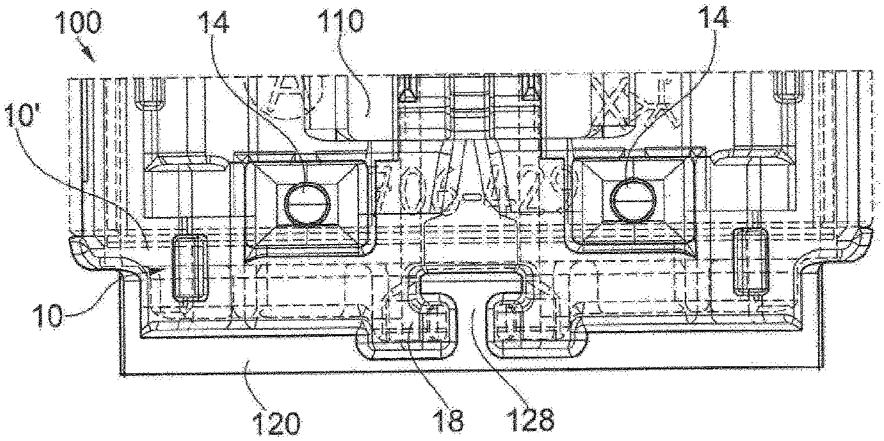
Figure 6:
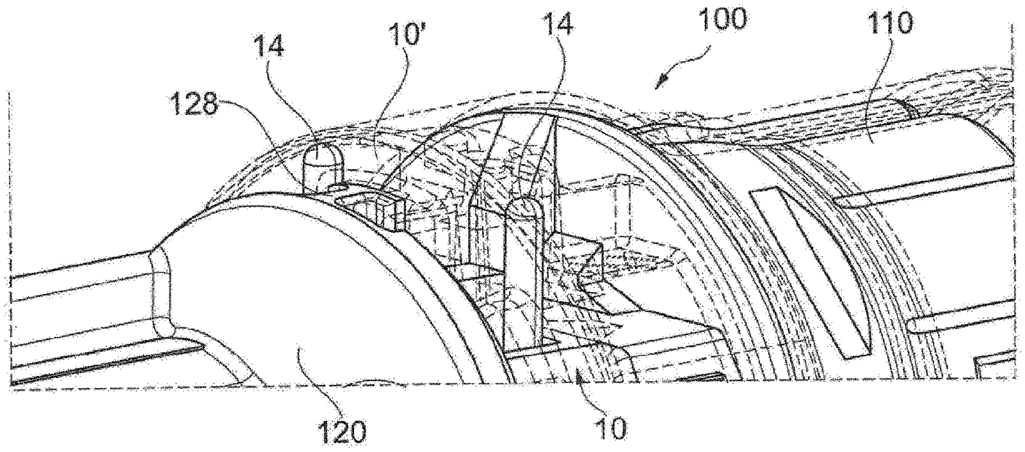

Further details and advantages of the invention will be apparent from the following embodiments described with reference to a drawing in which:

FIG. 1 is a schematic side view of a safety element of a first embodiment according to the invention, FIG. 2 is a schematic sectional view of a safety element of a second embodiment according to the invention, FIG. 3 is a schematic sectional view of a safety element of a third embodiment according to the invention, FIG. 4 is a schematic perspective sectional view of a second plug-in connection element and the second embodiment of the safety element according to the invention, FIG. 5 is a schematic partial sectional view of the connector according to the invention with second embodiment of the safety element according to the invention, and FIG. 6 is a schematic perspective partial sectional view of the connector according to the invention with second embodiment of the safety element according to the invention.

FIG. 1 is a schematic side view of a safety element 10 of a first embodiment according to the invention. The safety element 10 according to the invention is a safety element 10 for an electrical connector 100. The safety element 10 is designed in such a way that it is electrically insulating below a limit temperature $T_{Limit}$. The safety element 10 is further configured such that it is electrically conductive above the limit temperature $T_{Limit}$. A part of the safety element 10 is preferably in a hottest zone H of the electrical connector 100 when installed in the electrical connector.

The safety element 10 according to FIG. 1 is a secondary locking device.

Such a secondary interlock is preferably configured to lock together a first connector element 110 and a second connector element 120 of the connector 100.

The limit temperature $T_{Limit}$ is preferably in a range from 200° C. to 250° C., further preferably in a range from 210° C. to 240° C., in particular in a range from 220° C. to 230° C.

The safety element 10 according to FIG. 1 has a base body 10' made of a polymer. It can be provided that the polymer is electrically conductive above the limit temperature $T_{Limit}$.

Alternatively, the safety element 10 may comprise a base body 10' made of a polymer having a melting temperature corresponding to the limit temperature $T_{Limit}$. This ensures that the base body melts when the limit temperature is exceeded, exposing conductive elements of the safety element so that electrical contact is established.

As can be seen in FIG. 1, the safety element 10 has two projecting parts 16 that serve to lock together the first connector element 110 and the second connector element 120 of the connector 100. Outer ends 16E of the projecting parts 16 extend such that they are in the hottest zone H of the electrical connector 100.

Further, the safety element 10 comprises at least one guide 18 for guiding and properly positioning the safety element 10 in the connector 100 or in the first connector element 110 and the second connector element 120 of the connector 100.

Furthermore, the safety element 10 has at least one latching surface that serves to latch the safety element in the connector 100 or in the first connector element 110 and the second connector element 120 of the connector 100.

FIG. 2 is a schematic sectional view of a safety element 10 of a second embodiment according to the invention. The second embodiment is based on the safety element 10 of the first embodiment, whereby only the differences to the first embodiment of the safety element 10 are described below.

The base body 10' is formed with at least one bore 12. In general, the bore 12 accommodates an electrically conductive rod element 14. The safety element 10 is designed in such a way that, when the limit temperature $T_{Limit}$ is exceeded, the polymer from which the base body 10' is formed melts and the at least one electrically conductive element 14 is exposed, so that the safety element 10 is electrically conductive when the limit temperature $T_{Limit}$ is exceeded.

Preferably, the conductive element is formed as a pin 14 and, as shown in FIG. 2, each hole 12 accommodates a respective pin 14 formed of a conductive polymer or metal. The safety element 10 is formed such that above the limit temperature $T_{Limit}$, the polymer from which the base body 10' is formed melts and the pins 14, in particular their outer ends 14E, are exposed so that the safety element 10 becomes electrically conductive when the limit temperature $T_{Limit}$ is exceeded.

As can be seen from FIG. 2, two bores 12 are formed each holding a respective pin 14. The outer ends 14E of the pins are in the hottest zone H of the electrical connector 100. As can be seen from FIG. 2, each pin 14 is press fitted into the respective bore of the base body 10'.

According to the embodiment shown in FIG. 2, two holes 12 are formed in the base body 10' and an electrically conductive element, preferably a pin 14, is formed in each of the holes 12.

In this regard, the holes 12 are each formed in the projections 16 that serve to lock together the first connector element 110 and the second connector element 120 of the connector 100.

Preferably, the at least one bore 12 is designed as a blind hole or blind bore, so that it is only open at one end and so that the at least one electrically conductive element 14 can be pressed in through the open end. In the pressed-in state, the electrically conductive element 14 is surrounded by a uniformly thick material layer of the base body 10' and only the opening through which the conductive element 14 was pressed in remains open.

FIG. 3 is a schematic sectional view of a safety element 10 of a third embodiment according to the invention. The third embodiment is based on the safety element 10 of the second embodiment, where only the differences to the first embodiment of the safety element 10 are described below.

Deviating from the second embodiment, only a single electrically conductive element 14 is formed in the third embodiment. The electrically conductive element 14 is formed such that it has a plurality of outer ends 14E, each outer end 14E being associated with a respective bore 12. Thus, the electrically conductive element 14 engages in all bores 12. When the limit temperature $T_{Limit}$, is exceeded, the polymer from which the base body 10' is formed melts and the electrically conductive element 14, in particular the outer ends 14E of the electrically conductive element 14 are exposed, so that the safety element 10 becomes electrically conductive when the limit temperature $T_{Limit}$ is exceeded. In the case of the third embodiment example according to FIG. 3 for example, a short circuit can be made.

FIG. 4 is a schematic perspective sectional view of a second plug-in connection element 120 and a safety element 10 of the second embodiment according to the invention. However, it is also possible that a safety element 10 of another embodiment is used.

The second plug-in connection element 120 of the connector 100 has two electrical contacts 122, 124. The hottest zone H of the electrical connector 100 is located in the area of these electrical contacts 122, 124. The projecting parts 16 of the safety element 10 engage each of these electrical contacts 122, 124. If an impermissibly high temperature is reached at one of the electrical contacts 122, 124 in the form of the limit temperature $T_{Limit}$ being exceeded, the polymer of the respective projecting part 16 melts and electrical contact occurs. This is achieved by the pin 14 coming into electrical contact with the electrical contact 122, 124 of the second connector element 120. This triggers a measurable malfunction that can be detected so that it can be determined that the limit temperature $T_{Limit}$ in the connector 100 has been exceeded.

Preferably, the connector according to FIGS. 4 to 6 is a high-voltage connector (HV connector).

FIG. 5 is a schematic partial sectional view of the connector 100 according to the invention with the safety element 10 according to the invention of the second embodiment. However, it is also possible that a safety element 10 of another embodiment is used.

The connector 100 has a first connector element 110 and the second connector element 120 already described with reference to FIG. 4. The safety element 100 is configured as a secondary interlock to lock together the first connector element 110 and the second connector element 120.

FIG. 5 is the connector 100 in a secondary locked position. The safety element 10 that is designed as a secondary locking device is an intermediate element between the first plug-in connection element 110 and the second plug-in connection element 120 for locking the first plug-in connection element 110 and the second plug-in connection element 120.

As described above with reference to FIG. 4, the safety element 10 is in the hottest zone H of the connector 100 and is electrically conductive above the limit temperature $T_{Limit}$, so that a planned malfunction of the connector 100 occurs above the limit temperature $T_{Limit}$.

As already explained above, the safety element 10 has the guide 18. This guide 18 is formed as a groove, as can be seen clearly in FIG. 5. The guide groove can have a T-shaped cross-section as shown in FIG. 5.

As can also be seen well in FIG. 5, the second plug-in connection element 120 has a complementary guide formation 128. This complementary guide formation 128 is formed as a ridge, as can be seen well in FIG. 5. The guide projecting part may have a T-shaped cross-section as shown in FIG. 5.

Furthermore, the guide 18 and complementary guide formation 128 are configured such that the safety element 10 is guided relative to the second plug-in connection element 120 by the guide 18 and complementary guide formation 128.

FIG. 6 is a schematic perspective partial sectional view of the connector according to the invention, which is already shown in FIG. 5, with the safety element according to the invention of the second embodiment. However, it is also possible that a safety element 10 of another embodiment is used.

LIST OF REFERENCE SIGNS

10 Safety element
10' Base body
12 Bore
14 Pin
14E Outer end of the pin 14
16 Projecting part
16E Outer end of the bar
18 Guide
100 Connector
110 first connector element
120 second connector element
122 Electrical contact
124 Electrical contact
128 Counter guide formation F Press-in force
H hottest zone
$T_{Limit}$ Limit temperature

The invention claimed is:

1. A safety element for an electrical connector, the safety element being designed in such a way that it is electrically insulating below a limit temperature and electrically conductive above the limit temperature, wherein the safety element is configured, when above the limit temperature, to establish a direct electrical connection between first and second power contacts of the electrical connector by exposure of at least one electrically conductive element positioned to bridge the first and second power contacts.

2. The safety element according to claim 1, wherein the safety element is a secondary interlock for locking together a first connector element and a second connector element of the connector.

3. The safety element according to claim 1, wherein the limit temperature lies in a range from 220° C. to 230° C.

4. The safety element according to claim 1, wherein the safety element is formed from a polymer that is electrically conductive above the limit temperature.

5. The safety element according to claim 1, wherein the safety element comprises an element made of a bimetallic material designed to change electrical resistance and shape depending on temperature in such a way that it is electrically insulating below the limit temperature and is electrically conductive above the limit temperature.

6. The safety element according to claim 1, wherein the safety element comprises a shape-memory alloy element that changes shape above the limit temperature so that the safety element becomes electrically conductive when the limit temperature is exceeded.

7. The safety element according to claim 1, wherein the safety element is a 3D-printed element that is designed in such a way that it changes its shape above the limit temperature, so that the safety element is electrically conductive when the limit temperature is exceeded.

8. A safety connector comprising a safety element according to claim 1.

9. The safety connector according to claim 8, wherein the connector is a high voltage connector.

10. The safety connector according to claim 8, wherein the connector comprises a first plug-in connection element and a second plug-in connection element, and the safety element is designed as a secondary interlock for locking together the first plug-in connection element and the second plug-in connection element.

11. The safety connector according to claim 10, wherein in a secondary locked position of the safety connector, the safety element is in the hottest zone of the safety connector and is electrically conductive above the limit temperature, so that a planned malfunction of the safety connector occurs above the limit temperature.

12. The safety connector according to claim 8, wherein the connector is a high voltage connector, and wherein the high voltage refers to alternating voltages (AC) of 30 volts (V) to 1 kilovolt (kV) to 1 kV or to direct voltages (DC) of 60 V to 1.5 kV.

13. The safety connector of claim 8, wherein the design of the safety element being electrically insulating below the limit temperature and electrically conductive above the limit temperature ensures that the safety connector has its intended functionality providing an electrical connection below the limit temperature but the safety connector has an intentional malfunction when the safety element becomes electrically conductive above the limit temperature.

14. The safety connector of claim 8, wherein the limit temperature lies in a range from 220° C. to 230° C. to ensure that:

the limit temperature is present in only the hottest zone of the safety connector and is in a temperature range at which damage to the safety connector is prevented; and the safety element is in the hottest zone of the safety connector and is electrically conductive above the limit temperature, so that an intended malfunction of the safety connector occurs above the limit temperature.

15. The safety element of claim 1, wherein:

the safety element has an insulation resistance that is temperature dependent such that the insulation resistance changes with the temperature of the safety element; and a threshold value of the insulation resistance at which the safety element is considered electrically conductive is 100 kilo ohms to 500 kilo ohms.

16. The safety element of claim 1, wherein:

the at least one bore of the base body comprises two bores formed in the base body and each of the two bores holds an electrically conductive element and the at least one electrically conductive element is a pin.

17. The safety element according to claim 1, wherein the safety element comprises a reusable safety element that is reversible, becoming electrically conductive when the limit temperature is exceeded and returning to an electrically insulating state when the temperature falls below the limit several times.

* * * * *